June 2, 1953  C. S. WILLIAMS  2,640,276

PLUMB BOB LINE SPOOL

Filed April 25, 1952

INVENTOR
CHELSEA S. WILLIAMS,

BY
McMorrow, Berman & Davidson
ATTORNEYS

Patented June 2, 1953

2,640,276

UNITED STATES PATENT OFFICE 2,640,276

PLUMB BOB LINE SPOOL

Chelsea S. Williams, Metropolis, Ill.

Application April 25, 1952, Serial No. 284,320

3 Claims. (Cl. 33—217)

The present invention relates to a plumb bob line spool, and more particularly, has reference to a spool of the character described adapted to provide a means on which a plumb bob check line is windable when not in use and unwindable when desired, and which will not unwind until the line is needed, said spool additionally serving as a take-up device for adjusting the length of and locking the check line when the plumb bob is in use.

Plumb bob line spools are, of course, not new per se. However, while those spools of which I have knowledge permit the check line to be wound thereon, there is still a certain amount of inconvenience attendant upon their use, deriving from the fact that in each instance, the check line, after having been adjusted to a selected length, still must be tied to prevent undesired lengthening of the line while it is in use. In this connection, the tightening of the line is an inconvenience, so far as the worker is concerned, especially when one is working outdoors in a cold temperature, a condition which makes it difficult to handle the spool while wearing gloves.

The main object of the present invention, accordingly, is to provide a plumb bob line spool so formed as to permit a check line to be wound thereon or unwound with maximum ease and facility, the spool being so formed as to cause the check line to be securely engaged against undesired lengthening, and being further formed in a manner that will permit said engagement of the check line to be effected without the necessity of tying the line.

Another important object is to provide a plumb bob line spool as described which will be of a highly simplified construction, considering the benefits to be obtained from the use thereof, thus to permit the manufacture of the device at relatively low cost.

Yet another important object is to provide a spool as stated which is so formed as to be rugged and durable, whereby to prevent deterioration of the device by the elements.

Yet another important object is to provide a plumb bob line spool which can be assembled or disassembled with substantial speed and ease.

Summarized briefly, the invention includes a body having a portion on which a check line can be wound, the body having a peripheral lip circumposed about said portion. A disk is positioned adjacent said portion of the body, and is also formed with a peripheral lip, with the lips extending into engagement with one another and protectively enclosing the wound line. The body and disk have coaxial bores, a spring being extended through the bores for the purposes of urging the body and disk toward one another, whereby to press the lips into frictional engagement and thus clampably engage the check line therebetween. The spring is circumposed about a length of line, the purpose of which is to keep the spring from being expanded to such an extent as would destroy the tension thereof. The spring and its associated length of line are removably connected at one end to the body, and at their other ends are engaged with a hook member extending through the bore or opening of the disk, said hook member being assembled with a button that overlies the disk. The spring and button are so arranged, relative to the body and disk as to not only cause said body and disk to be urged into a line clamping position, but also to bind the button against the disk, to permit the check line to be wound about the hook member and gripped between the button and disk after passage of said check line between the lips of the body and disk.

Other objects will appear from the following description, the claims appended thereto, and from the annexed drawing, in which like reference characters designate like parts throughout the several views, and wherein:

Figure 1:
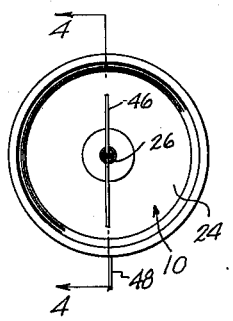
Figure 1 is an end elevational view of a plumb bob line spool formed in accordance with the present invention.
Figure 2:
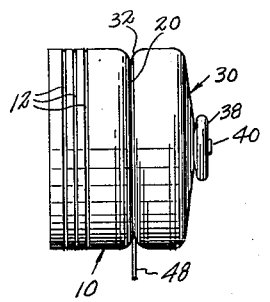
Figure 2 is a side elevational view.
Figure 3:
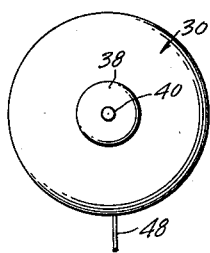
Figure 3 is an end elevational view, showing the other end of the device.

Referring to the drawings in detail, the reference numeral 10 has been applied generally to a body, said body being formed of any suitable material, such as molded plastic or the like. The body 10, in this connection, is generally cylindrical in form, and I prefer that there be provided on the outer surface of said body spaced, circumferential grooves 12, that permit the user to grip the body securely.

Formed upon the body 10 is a portion 14 on which a plumb bob line is windable, said portion being formed as an axial extension of the body and being integral, at its free end, with an outwardly directed, annular flange disposed in a plane perpendicular to the axis of the body and designated by the reference numeral 16.

The provision of the reduced, axial extension 14 defines, at the base of said extension, an annular shoulder 18 on the body, said shoulder being spaced longitudinally of the body from the flange 16.

An annular lip 20 is integrally formed upon the body, said lip being formed on the marginal portion of the shoulder 18 and being concentric with and extended in the direction of the flange 16.

The relative formation and arrangement of the shoulder 18 and flange 16 defines, between said flange and shoulder, a circumferential recess 22 on the axial extension 14, said recess being adapted to receive a plumb bob check line when said line is to be wound upon the extension.

The other end of the body 10 is preferably recessed as at 24, and formed in the body is an axial bore 26, said bore opening at one end on the recessed end 24 of the body, and communicating at its other end with a counterbore 28 formed in the axial extension 14, said counterbore being aligned coaxially with the bore 26.

A clamping disk has been designated by the reference numeral 30, said clamping disk being generally flat in configuration and being integrally formed with a peripheral lip 32 extending toward the lip 20 of the body 10.

Also formed integrally upon the disk 30 is a center boss 34, said boss being extendable into the counterbore 28. A center opening 36 is provided in the disk, said disk opening extending through the boss so as to communicate with the counterbore 28, and being aligned coaxially with said counterbore and with the bore 26 of the body 10.

The device constituting the present invention includes a button 38, which is positioned exteriorly of the disk 30, said button overlying the adjacent end of the opening 36 and being so formed as to bind against the edge of said opening when the button is urged in the direction of the disk.

Figure 4:
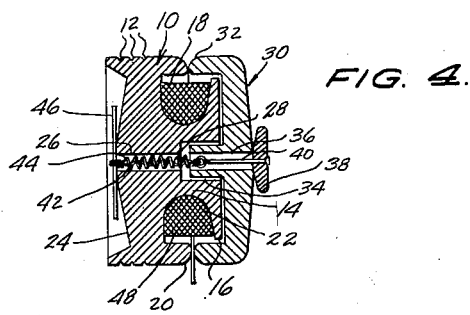
Figure 4 is a longitudinal sectional view taken substantially on line 4—4 of Figure 1.

A hook member 40 is formed with a head at one end, said hook member extending through a center opening provided in the button 38, with the head engaging the button to prevent the hook member from being separated accidentally from the button. The hook member, as will be noted from Figure 4, extends through the center opening 36 of the disk, the inner end of the hook member being provided with a hook engaging one end of a spring 42. The spring 42 extends through the axial bore 26 of the body 10, and also extended through said axial bore is a short length of line 44, that is connected at one end to the hook of the hook member 40.

A cross pin has been designated 46, and is removably engaged with the other ends of the spring 42 and length of line 44. The cross pin serves, in this regard, to hold the spring under tension, thus to assemble the disk with the body and urge the disk and body toward one another, thereby to engage the lips 20, 32 throughout their respective circumferences, in a manner best shown in Figure 4.

The purpose of the length of line 44 is to permit a user to check the distance that clamp disk 30 can be separated from body 10, this being desirable to eliminate the possibility of over-expanding the spring 42. Over-expansion of the spring would destroy the tension necessary to press the lip 32 in the direction of the lip 20 of the body 10, the engaging lips serving to prevent plumb bob check line 48 from unwinding unless desired. Further the line 44 permits one to check the distance that button 38 can be separated from disk 30, thereby eliminating the possibility of expanding the spring 42 to such an extent as would destroy the tension necessary to press the button 38 against disk 30. The engaging button and disk lock the plumb bob check line after the desired amount has been unwound, and also lock the plumb bob check line after the plumb bob has been adjusted to the desired height.

In assembling the parts, and assuming that the parts are separated, one would first engage the spring and the line with the hook member 40, after which any hooked tool, not shown, is extended through the bore 26, counterbore 28, and center opening 36. The hook shaped tool would then be engaged with the line and spring, and would be utilized to extend the spring to the length of the line. Thereafter, the extended line 44 and spring 42 are pulled through the bore 26, and the cross pin 46 is engaged therewith in the manner shown in Figure 4.

The plumb bob check line is wound upon the extension 14, within the circumferential recess 22 thereof. By passing the check line 48 between the lips 20, 32 it is clampably engaged by said lips at all times, due to the tension of the spring 42.

Figure 5:
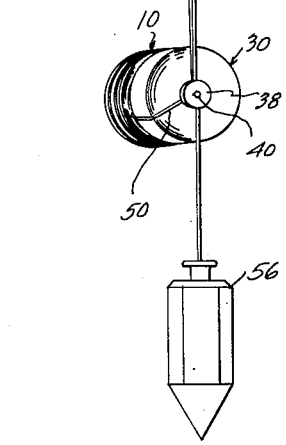
Figure 5 is a perspective view of the spool as it appears when in use.

In use, a selected length of line is unwound from the extension 14, it being understood that the pressure of the lips 20, 32, upon the line is not so great as to prevent the unwinding thereof. Thereafter, the check line is extended over the disk 30 as at 50 (Figure 5), and is given a turn about the button 38. This locks the line against further unwinding.

The check line is then passed over a grade line 52 as at 54, and the plumb bob 56 can be adjusted to any height desired. As soon as the plumb bob has been adjusted as to height, it is retained at the height selected by winding the check line once again about the button 38. Thus, the purpose of the button is to lock the line coming from the spool, and also to lock the line after the plumb bob has been adjusted to the proper height.

It is to be noted that the weight of the plumb bob will draw the line tight about the hook member 40, under the button, thus to lock all the parts in a selected relationship.

It is believed to be an important characteristic of the present invention that the construction illustrated and described is a very simple one, having a minimum of parts simply arranged. Nevertheless, despite the inherent simplicity of the arrangement, the spool permits the winding of a long length of check line thereupon, and is also formed to permit the unwinding of a selected part of said length whenever the device is to be used. The spring 42, in this connection, not only serves to cause the beveled lips 20, 32, to bind frictionally against the line for the purpose of preventing further unwinding, but also causes the button 38 to bind against the disk 30, thereby to provide a second location about which the line is wound, for locking the line.

It is believed clear that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A plumb bob line spool comprising: a body formed with an axial bore and having a portion on which a check line can be wound, said portion being formed as an axial extension of the body and having a counterbore coaxial with and communicating with said bore; a clamping disk having a center opening and arranged adjacent said portion, said disk including a center boss extendable into the counterbore to hold the body and disk assembled in coaxial alignment; circumferential lips extending toward one another from the disk and body respectively, said lips being circumposed about said portion for protectively enclosing the wound line; and a spring extending through said bore and opening and engaged at opposite ends with the body and disk, said spring being tensioned to yieldably urge the body and disk toward one another, to force said lips into frictional engagement and thereby clampably engage said check line between the lips.

2. A plumb bob line spool comprising: a body formed with an axial bore and having a portion on which a check line can be wound, said portion being formed as an axial extension of the body and having a counterbore coaxial with and communicating with said bore; a clamping disk having a center opening and arranged adjacent said portion, said disk including a center boss extendable into the counterbore to hold the body and disk assembled in coaxial alignment; circumferential lips extending toward one another from the disk and body respectively, said lips being circumposed about said portion to protectively enclose the wound line; a button positioned against the disk and including a hook member extending into said opening; and a spring extending through said bore and opening and engaged at opposite ends with the body and hook member respectively, said spring being tensioned to yieldably urge the body and disk toward one another to force said lips into frictional engagement, whereby to clampably engage said check line between the lips, said button comprising means about which the check line is windable after passage thereof between the lips.

3. A plumb bob line spool comprising: a generally cylindrical body formed with an axial bore and having a portion on which a check line can be wound, said portion being formed as an axial, reduced extension of the body and having a counterbore coaxial with and communicating with said bore, said extension defining, in cooperation with the body, a shoulder on said body extending about one end of the extension, said extension including an outwardly directed flange on its other end, whereby to provide between the flange and shoulder an annular recess receiving the wound line; a clamping disk having a center opening and arranged adjacent said portion, said disk including a center boss extendable into the counterbore to hold the body and disk assembled in coaxial alignment; peripheral lips on the shoulder and disk respectively extending toward one another and arranged about said recess for protectively enclosing the wound line; a button positioned against said disk and including a hook member extending into said opening; a spring extending through said bore and opening; a cross pin removably engaged with one end of the spring and positioned against the body to hold the spring assembled therewith, said spring having its other end engaged with the hook member, the spring being tensioned to yieldably urge the body and disk toward one another, to force said lips into frictional engagement, thereby to clampably engage said check line between the lips, said button comprising means about which the check line is windable after passage thereof between the lips; and a length of line engaged with the hook member and extending through said spring and engaged with the cross pin, said last-named length of line constituting means effective to limit expansion of the spring.

CHELSEA S. WILLIAMS.

References Cited in the file of this patent

UNITED STATES PATENTS

| Number | Name | Date |
|---|---|---|
| 1,608,022 | Hanson | Nov. 23, 1926 |
| 2,533,731 | Gomberg | Dec. 12, 1950 |